US007114417B1

(12) United States Patent
Dring

(10) Patent No.: US 7,114,417 B1
(45) Date of Patent: Oct. 3, 2006

(54) ADJUSTABLE SPANNER WRENCH FOR SPANNER HEADS HAVING DIFFERENT SIZE HOLES

(76) Inventor: Tom Dring, 1949 Park Dr., Loveland, CO (US) 80538

( * ) Notice: Subject to any disclaimer, the term of this patent is extended or adjusted under 35 U.S.C. 154(b) by 38 days.

(21) Appl. No.: 11/068,212

(22) Filed: Feb. 28, 2005

(51) Int. Cl.
*B25B 23/16* (2006.01)
*B25B 13/28* (2006.01)
*B25B 13/10* (2006.01)
*B25B 7/22* (2006.01)
*B65G 7/12* (2006.01)

(52) U.S. Cl. ........................ 81/176.3; 81/111; 81/178; 7/125; 294/16

(58) Field of Classification Search ............... 81/176.3, 81/111, 178; 7/125, 138, 139, 426; 294/2, 294/3, 16; 269/279, 280, 283, 284; 206/378
See application file for complete search history.

(56) References Cited

U.S. PATENT DOCUMENTS 3,745,860 A * 7/1973 Bennett ..................... 81/124.4
4,676,126 A 6/1987 Polastri
4,831,905 A * 5/1989 Murchison .................... 81/485
D337,492 S 7/1993 Ryan et al.
5,237,749 A * 8/1993 Henning et al. ........... 30/123.6
5,347,891 A 9/1994 Kamp et al.
5,365,809 A * 11/1994 Hsiao ........................ 81/176.3
5,469,766 A 11/1995 Hodges
6,009,582 A * 1/2000 Harrison et al. ............... 7/118
6,305,254 B1 10/2001 Hsieh
6,325,432 B1 * 12/2001 Sensat ......................... 294/16
6,779,212 B1 * 8/2004 Anderson et al. .............. 7/128
7,032,750 B1 * 4/2006 Amtenbrink ................ 206/379

* cited by examiner

*Primary Examiner*—Lee D. Wilson
*Assistant Examiner*—Alvin J. Grant
(74) *Attorney, Agent, or Firm*—Richard L. Miller

(57) ABSTRACT

An adjustable spanner wrench for various spanner head work piece having different size holes where various spanner driver element are able to be stored on the arms of the wrench itself, instead of being stored somewhere else in a separate container where they can be easily lost or misplaced.

6 Claims, 1 Drawing Sheet

ADJUSTABLE SPANNER WRENCH FOR SPANNER HEADS HAVING DIFFERENT SIZE HOLES

BACKGROUND OF THE INVENTION

1. Field of the Invention

The present invention relates to spanner wrenches and more particularly to adjustable spanner wrenches with multiple, self-carried, differently sized spanner driver elements.

2. Description of the Prior Art

Numerous innovations for adjustable spanner wrench for spanner head work pieces having different size holes have been provided in the prior art that will be described. Even though these innovations may be suitable for the specific individual purposes to which they address, accordingly they differ from the present invention.

A FIRST EXAMPLE, U.S. Pat. No. 4,676,126 to Polastri teaches an adjustable wrench head is disclosed for use in conjunction with spanner nuts of various sizes, each spanner nut having a plurality of locking recesses therein. More particularly, a wrench head is provided which includes a central elongated driving spindle having a plurality of opposed pairs of planar guide rails projecting radially outwardly therefrom. Each pair of guide rails defines a channel, which is adapted to receive a generally rectangular insert, with the insert being radially movable therein, relative to the central spindle. Each insert is provided with a tang which projects axially beyond the front end of the spindle for engagement with a locking recess of the spanner nut. The radial position of the inserts are adjusted and secured such that the tangs thereof are spaced from the center of the spindle a distance corresponding to the radius of the spanner nut. Preferably, a plurality of planar webs are provided which extend between one guide rail of one pair and the adjacent guide rail of another pair. The planar webs function to add structural rigidity to the wrench head and prevent deflection of the guide rails.

A SECOND EXAMPLE, U.S. Pat. No. D337,492 to Ryan, et al. shows the ornamental design for a folding spanner wrench.

A THIRD EXAMPLE, U.S. Pat. No. 5,347,891 Kamp, et al. teaches an adjustable wrench assembly for installing and removing a threaded cap member of an hydraulic cylinder assembly includes a head member adapted to partially surround the piston rod of the cylinder assembly. A cover plate attaches to the head member to completely surround the piston rod. A plurality of adjustable contact pins accommodate various sizes of piston rods and are engagable with the piston rod to keep the wrench square and prevent it from twisting. Various sizes of adapter plates are connectable to the head member and include a plurality of engagable pins to engage mating slots or holes in the cap member. The adjustable contact pins include non-metallic plastic contact portions to prevent marring of the piston rod.

A FOURTH EXAMPLE, U.S. Pat. No. 5,469,766 to Hodges teaches an adjustable spanner wrench comprising of a pair of handle halves, the handle halves including a first handle half and a second handle half, the first handle half being provided with an interior channel along its length. Jaws in the form of two C-shaped arms, the C-shaped arms each having an outboard extent with an aperture therethrough, each C-shaped arm having an inboard extent with an aperture and an associated rivet coupling the outboard ends of the handle halves to the inboard extents of the arms. A pivotable clip having a free end and a pivot end pivotally secured to each outboard end of each C-shaped arm and a semicircular recess at its free end, the semicircular recess adapted to be moved in position concentric with its associated aperture for contacting the groove of the pin received in an aperture.

A FIFTH EXAMPLE, U.S. Pat. No. 6,305,254 to Hsieh teaches a combination tool kit includes an elongated casing, a hexagon head socket holder mounted in the casing between front and rear ends of the casing and holding a set of hexagon head sockets adapted for turning bolts and nuts, a combination wrench pivoted to the front end of casing, the combination wrench having an open end and a box end at two distal ends thereof adapted for grasping and turning bolts and nuts, and a hexagonal spanner block pivoted to the rear end of casing, the hexagonal spanner block having a hexagonal box adapted to work with one of the hexagon head sockets stored in the hexagon head socket holder for turning bolts and nuts. The storage bin for the spare sockets is located at the back of the wrench, thus ruining proper weight distribution for a user.

A SIXTH EXAMPLE, McMaster Carr catalog shows three double armed spanner driver element spanner wrenches. None has provisions for spanner driver element storage thereupon.

Contrarily, the instant spanner wrench stores alternative sized spanner driver elements upon the length of its own arms. Thus, it maintains and contributes to proper weight distribution for a user for most efficient use and the ease of finding an locating a required sized set of spanner driver elements.

SUMMARY OF THE INVENTION

AN OBJECT of the present invention is to provide an adjustable spanner wrench for spanner head work pieces having different size holes that avoids the disadvantages of the prior art.

ANOTHER OBJECT of the present invention is to provide an adjustable spanner wrench for spanner head work pieces having different size holes that is simple and inexpensive to manufacture.

STILL ANOTHER OBJECT of the present invention is to provide an adjustable spanner wrench for spanner head work pieces having different size holes that is simple to use.

BRIEFLY STATED, STILL YET ANOTHER OBJECT of the present invention is to provide an adjustable spanner wrench for spanner head work pieces having different size holes that has a storage bay for storing different sized sets of spanner driver elements to be used with the spanner wrench so that they will not be inadvertently lost or misplaced.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALLING OF REFERENCE NUMERALS UTILIZED IN THE DRAWING

Figure 1:
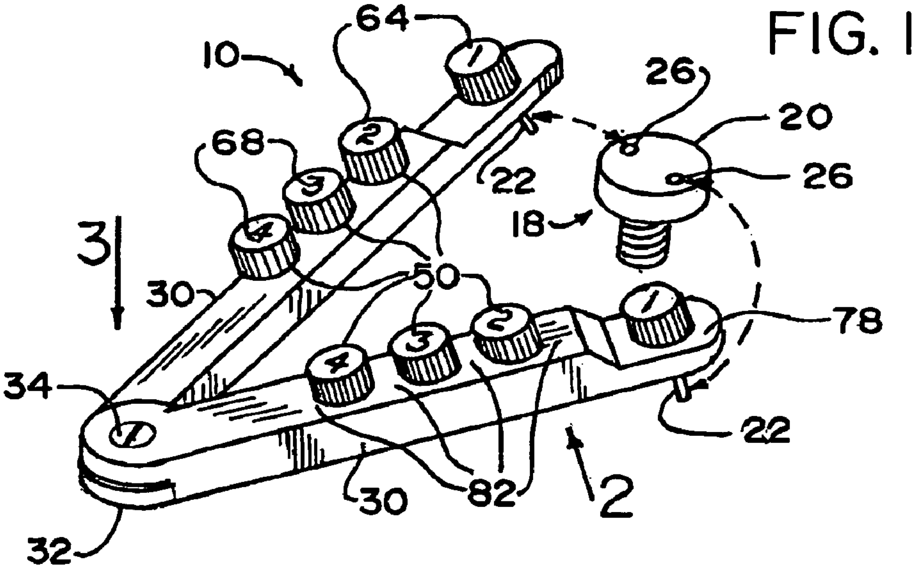
FIG. 1 is a diagrammatic perspective view of the present invention showing it cooperating with a work piece, typically a machine screw which utilizes a spanner wrench.
Figure 2:
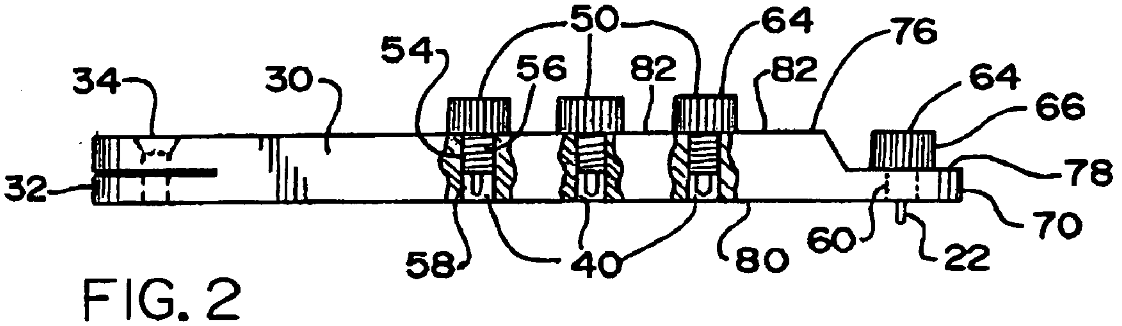
FIG. 2 is a side elevational view taken in the direction of arrow 2 in FIG. 1, with parts broken away.
Figure 3:
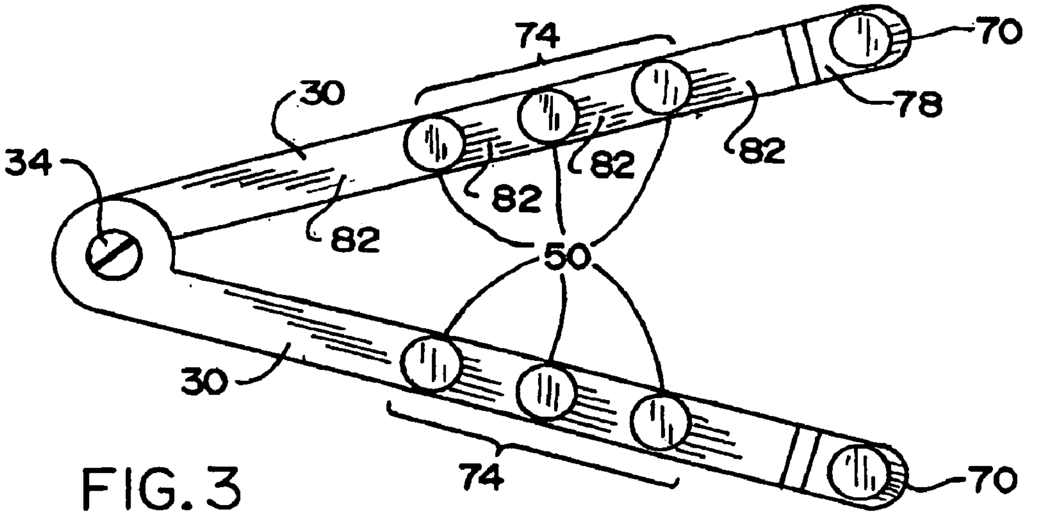
FIG. 3 is a top elevational view taken in the direction of arrow 3 in FIG. 1.

| | |
|---|---|
| 10 | adjustable spanner wrench |
| 18 | work piece |
| 20 | typical machine screw |
| 22 | engageable pins |
| 26 | hole in working screw |
| 30 | dual arms |
| 32 | proximal end |
| 34 | pivot |
| 40 | spanner driver element storage bays in spanner wrench arms 30 |
| 50 | spanner driver elements |
| 54 | male threads on a shank of 56 |
| 56 | shank of spanner driver elements 50 |
| 58 | thread bay |
| 60 | spanner driver element working bay in dual arms 30 |
| 64 | top surfaces of the heads 66 |
| 66 | heads of the spanner driver elements 50 |
| 68 | indicia |
| 70 | distal ends of the dual arms 32 |
| 74 | a mid portion of arms 30 |
| 78 | depressed surface, of the dual arms 30 |
| 80 | bottom surface, of the dual arms 30 |
| 82 | adjacent surfaces next to the spanner driver element storage bays 40 |

DETAILED DESCRIPTION OF THE PREFERRED EMBODIMENT

Referring now to the figures, in which like numerals indicate like parts, and particularly to FIG. 1, the invention is an adjustable spanner wrench which 10 is shown about to grip a work piece 18 illustrated as a typical machine screw 20. Engageable pins 22 mate with receiving holes 26 of the screw 20. This prevents slipping of the adjustable spanner wrench 10 while it is being used to tighten or loosen a work piece which is a spanner driven component i.e. a spanner screw or spanner nut.

The adjustable spanner wrench 10 comprises dual arms 30 rotatively attached at a proximal end 32 by a pivot 34. This simple configuration perfectly accomplishes the necessary operation of gripping the work piece 18 typically a screw 20, by aligning the engageable pins 22 for entry into holes 26 of the screw 20.

The adjustable spanner wrench 10 is adapted to handle various work piece type items 20 that may be in different sizes and/or different units of size measurement, and the like. Towards this end, differently sized engageable pins 22 must be used. Thus, a plurality of sets of different individual spanner driver elements 50 must be provided for each operation requiring a differently sized engageable pins 22 since these pins are an integral part of the spanner driver elements 50.

In the past, these items needed to be carried separately or in an associated carrying container. The adjustable spanner wrench 10, however, provides for spanner driver element storage bays 40 built-in or set into, and integral with, a mid portion of 74, of arms 30. Each one of spanner driver element storage bays 40 is intended to store a differently sized pair of spanner driver elements 50, which have differently sized pairs of engageable pins 22, which accordingly have threaded shanks 56, which are held into a thread bay 58 by male threads 54 on a shank 56 of spanner driver elements 50. Thus a user never needs to look for, nor lose the requisite spanner driver elements 50 that fits into the pair spanner driver element working bays 60, located at a distal ends 70 of the dual arms 30 in the adjustable spanner wrench 10. This arrangement makes them instantly available for use or alternatively ready for switching with those located in the storage bays.

It is to be observed that the distal ends 70 of dual arms 30 each have a depressed surface 78 which is closer to a bottom surface 80, of the dual arms 30, than adjacent surfaces 82 next to the spanner driver element storage bays 40. This geometry permits the engageable pins 22 of the spanner driver elements to protrude out of the bottom surfaces 80 of the dual arms 30 when the elements are installed in the working bays 60 so that a work piece 18 may be easily engaged, but simultaneously prevents the engageable pins 22 of those elements stored in the storage bays from interfering with any work environment and causing any inadvertent damage to either the pins themselves or the surrounding work environment.

IN OPERATION, a plurality of spanner driver elements 50 are stored in a plurality of spanner driver element storage bays 40 on arms 30 of adjustable spanner wrench 10. Each spanner driver element 50 is immediately available at the work place for use, as may required, as a result of being stored on the wrench arms 30 themselves instead of off somewhere else in a separate storage container as is required by the prior art. Thus, the adjustable spanner wrench 10 and its varying working spanner driver elements 50, are always available without waste of searching time for spanner driver elements that fit the work pieces 18 or screws 20. This unique storage position maintains proper wrench balance and does not interfere with a user's operations in using said adjustable spanner wrench 10. Appropriately the top surfaces 64 of the heads 66 of the spanner driver elements 50 may optionally have indicia 68 which is indicative of a particular size.

It will be understood that each of the elements described above, or two or more together, may also find a useful application in other types of constructions differing from the types described above.

While the invention has been illustrated and described as embodiments of an adjustable spanner wrench for spanner heads having different size holes, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An adjustable spanner wrench for various spanner head work pieces having different size holes, which comprises:

a) dual arms rotatively attached around a pivot;

b) spanner driver element storage bays set into, a mid portion of, said dual arms; and c) a pair of spanner driver element working bays, each located at a distal end of said dual arms, to receive a working set of spanner driver elements, that have been stored in said spanner driver element storage bays so that they may be utilized for rotating said spanner work pieces.

2. The wrench of claim 1 wherein a plurality of sets of spanner driver elements are provided to be stored in said spanner driver element storage bays.

3. The wrench of claim 2 wherein each said sets of spanner driver elements have engageable pins of different sizes.

4. The wrench of claim 3 wherein said spanner driver elements have a threaded shank, which are held into said spanner driver element bays by a male thread on said shank of said spanner driver elements, which engages a female thread in said spanner driver element bays.

5. The wrench of claim 4 wherein said dual arms each have a depressed surface which is closer to a bottom surface, of said dual arms, than adjacent surfaces next to said spanner driver element storage bays, so that engageable pins of said spanner driver elements will protrude out of said bottom surfaces of said dual arms when the elements are installed in said working bays permitting said work piece to be easily engaged, but simultaneously preventing said engageable pins of said elements stored in said storage bays from interfering with any work environment and causing any inadvertent damage to either said pins themselves or a surrounding work environment.

6. The wrench of claim 5 wherein said spanner driver elements have indicia which is indicative of a particular size.

* * * * *